J. F. RICHARDSON.
BALL BEARING.
APPLICATION FILED MAY 20, 1916.
1,214,825.
Patented Feb. 6, 1917.
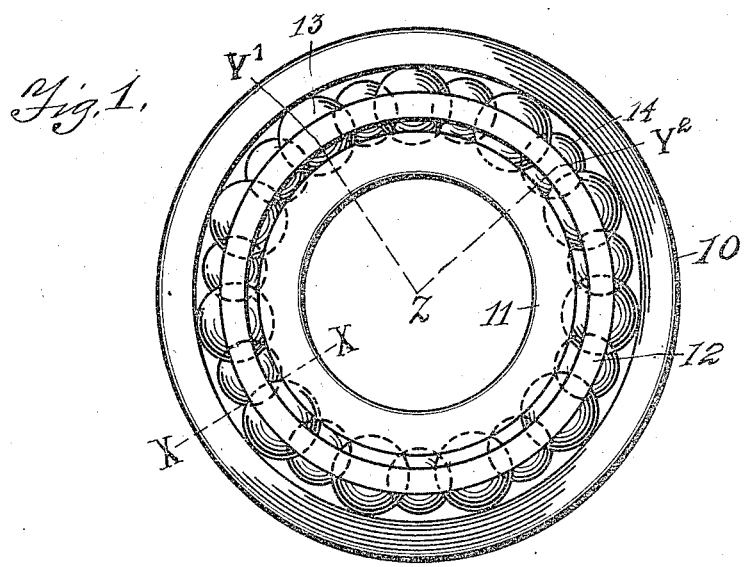
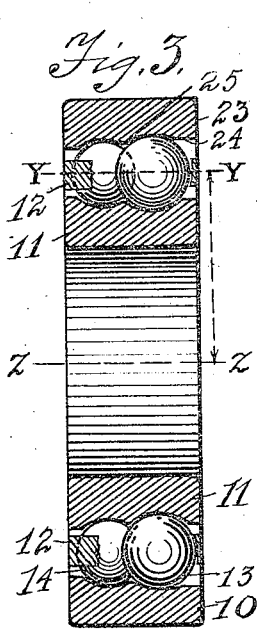
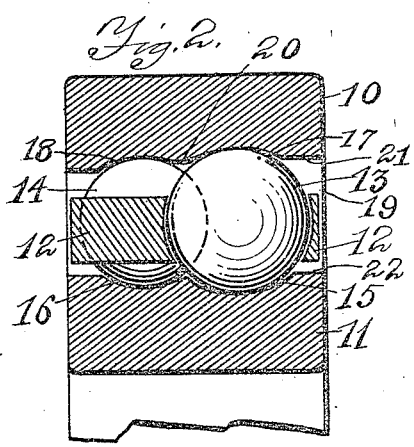
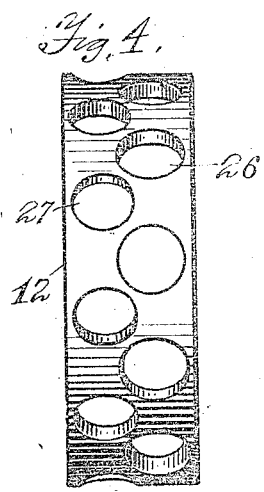
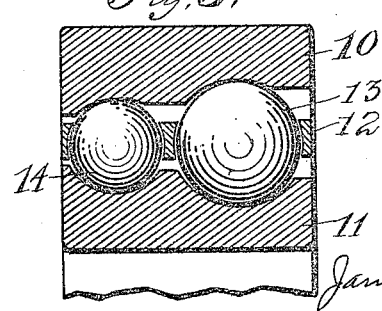
Witnesses
C. O. Hultgren
H. A. Sandberg
Inventor
James Frederick Richardson
By S. Arthur Baldwin
Attorney

UNITED STATES PATENT OFFICE.

JAMES FREDERICK RICHARDSON, OF JAMESTOWN, NEW YORK.

BALL-BEARING.

1,214,825.

Specification of Letters Patent.   Patented Feb. 6, 1917.

Application filed May 20, 1916. Serial No. 98,816.

*To all whom it may concern:*

Be it known that I, JAMES FREDERICK RICHARDSON, a citizen of the United States, residing at the city of Jamestown, in the county of Chautauqua and State of New York, have invented certain new and useful Improvements in Ball-Bearings, of which the following, taken in connection with the accompanying drawings, is a specification.

The invention relates to ball bearings and especially to ball bearings for a plurality of rows of load supporting balls; and the improvement consists, first, in providing a plurality of rows of different sized balls which travel in parallel race ways, one size to each race way, which race ways are preferably continuous or unbroken, said rows of balls having the same axes, that is, the axis of each of said rows of different sized balls is at the same radial distance from the axis of the ball bearing; the race ways being shaped to support the different sized balls on said axial line; and second, in assembling a plurality of sets of balls into a plurality of parallel race ways from one side of the ball supporting rings; and the invention consists in the novel features and combination hereinafter set forth and claimed.

In the drawings, Figure 1 is a side elevation of the improved ball bearing showing the different sized balls in staggered relation. Fig. 2 is a crosswise sectional view at line X—X in Fig. 1 showing the preferred form of race ways in each of the race rings and the staggered relation of the balls in the spacing or separating ring. Fig. 3 is a diametrical sectional view of a ball bearing showing a modified form of race ways in the outer race ring for ease of assemblage. Fig. 4 is an edgewise elevation of the spacer or separator showing the staggered relation of the openings for the balls in the different race ways. Fig. 5 is a sectional view of a ball bearing showing the non-staggered relation of different sized balls having the same axes.

The numeral 10 designates the outer race ring or outer ball supporting member, and the numeral 11 the inner race ring or inner ball supporting member.

The numeral 12 designates the separator or spacing element for the different sized balls 13 and 14.

The rings 10 and 11 have the parallel race ways 15 and 16 on the outer side of the inner ring 11, and 17 and 18 on the inner side of the outer ring 10. The race way 17 is opposite the race way 15 and both are slightly larger, usually about four per cent., than the balls 13 to permit said balls 13 to run freely in said race ways without friction and to thereby permit a larger load on said balls 13 and rings 10 and 11 to overcome the friction from distortion of said parts, the race ways 16 and 18 being correspondingly slightly larger than the balls 14 for the same reasons. This distortion of the parts arises from the weight of the load slightly enlarging the balls and diminishing the race way as the balls bear into said race way. Unless allowance was made for this distortion of the parts by the larger race ways the friction would be too great for the bearings to operate efficiently.

The balls are assembled in the race ways from the larger opening or larger ball side which gives a gradually diminishing opening into which the rows of balls may be assembled by sidewise pressure. The form of the race ring 10 shown in Fig. 2 is preferred in which the wall 21 of the race way 17 is much lower than the wall 22 of the race way 15 of the ring 11 opposite thereto. The wall 21 and the wall 20 being sufficiently low to permit the balls 13 and 14 being sprung by sidewise pressure into the race ways 17 and 18 in the outer race ring 10 when said balls are held in the race ways 15 and 16 in the inner race ring 11.

A modification of the race ring 10 is shown in Fig. 3, in which the ring 23 has the straight counter bores 24 and 25 for the race ways for the two rows of balls 13 and 14. This straight counter bore permits the two rows of balls to pass in freely but takes away all holding or thrust capacity for the balls from that side of the race ring 23. The inner race ring is the same as ring 11. This makes an easily disassembled bearing which is specially applicable to certain uses.

The race ways 15—17 and 16—18 in which the balls 13 and 14 are mounted are so closely contiguous with one another that said balls would interfere with one another unless they were placed in the staggered relation. It is apparent that it would be impossible with such closely contiguous race ways to run a full complement of balls. Accordingly they are staggered sufficiently to permit the close parallel placing of said race ways.

The separator 12 holds the balls in openings 26 and 27 in their staggered relation to one another in the race ways, and said balls being on the same axis on account of the shape of the race ways in the race rings will travel at the same rate of speed in the different sized race ways. They travel at the same rate of speed in the different race ways because they are on the same axes, thus as shown in Figs. 1 and 3, they are equidistant as to their axes from the axis of the ball bearing.

The line Z—Z represents the axis of the ball bearing and the parallel line Y—Y represents the axes of the large and small balls in the different race ways; thus in Fig. 1 the line from axis Z to the axis $Y^1$ in the large ball is exactly equal to the line from axis Z to axis $Y^2$ in the small ball. The race ways being shaped to support the two different sized balls at the same axes will of course permit said balls to travel at the same rate of speed in their staggered relation without interfering with one another or slipping in said race ways.

By the staggered relation of the two rows of balls, it is apparent that the thrust will be equalized between these two rows of balls and that accordingly a larger thrust capacity will be given the bearing within a narrow width of race ring, that is, a ring too narrow for two non-staggered rows. The staggered relation also of the balls gives a much larger number of load supporting balls within said narrow width of race ring. This enables a standard width race ring for a single complement of balls to have about five-eighths greater load capacity than said single complement of balls in the same width of ring. It would not, however, depart from that portion of my invention which has to do with the placing of the balls of different sizes on the same axes, to place two full complements of different sized balls in parallel rows between two rings of greater width, as shown in the modification in Fig. 5. This arrangement would take wider race rings and could not be used within the standard size width space for a single complement of balls as could the staggered relation of the balls unless the sizes of said full double complement of balls were so greatly reduced as to impair the load capacity of the bearing. It will therefore be understood that the staggered relation of the balls is preferred on account of the economy in the amount of space occupied in the race ring, the ease of assemblage, and the larger sized balls permitted by the staggered relation, thereby making a more efficient bearing.

I claim as new:

1. A ball bearing comprising an outer race ring and an inner race ring with oppositely placed different sized race ways on their outer and inner surfaces and correspondingly different sized balls supported in said different sized race ways between said race rings with their axes equidistant from the axis of the ball bearing.

2. A ball bearing comprising inner and outer race rings with a plurality of rows of different sized balls therebetween, said race rings having race ways interferingly close to one another for said rows of different sized balls, and means for holding said balls in staggered relation in said close race ways.

3. A ball bearing comprising an inner race ring and an encircling outer race ring with pairs of different sized race ways oppositely placed on their opposed surfaces, the outer wall of one race way on each ring being higher than the outer wall of adjacent race way, and correspondingly different sized balls supported in the different sized race ways between said rings with their axes in a common cylinder whose axis coincides with the axis of the ball bearing.

4. A ball bearing comprising an inner race ring having a plurality of different sized race ways on its outer surface, an outer race ring having a plurality of different sized race ways on its inner surface, rows of correspondingly different sized balls in said race ways, the wall of each of said race ways toward the larger race way side of said outer ring being lower than the wall toward the smaller race way side to permit the assemblage of said inner race ring and said rows of different sized balls into said outer race ring from said larger race way side of said outer ring.

5. A ball bearing comprising an inner race ring and an encircling outer race ring with pairs of different sized race ways oppositely placed on their opposed surfaces, the outer wall of one race way on each ring being higher than the outer wall of adjacent race way, and rows of balls arranged in the race ways between the rings, the balls of one row being different sized from and staggered relative to the balls of the adjacent row, and the axes of all of the balls being equidistant from the axis of the ball bearing.

In testimony whereof I have affixed my signature in the presence of two witnesses.

JAMES FREDERICK RICHARDSON.

Witnesses:
   H. A. SANDBERG,
   A. W. KETTLE.